(12) United States Patent
Kim et al.

(10) Patent No.: US 11,451,504 B2
(45) Date of Patent: Sep. 20, 2022

(54) METHOD AND APPARATUS FOR OPERATING INSTANT MESSAGING SERVER

(71) Applicant: KAKAO CORP., Jeju-si (KR)

(72) Inventors: Myung Jun Kim, Seongnam-si (KR); Myung O Ha, Seongnam-si (KR); Jin Hwan Lee, Seongnam-si (KR); Hun Jae Lee, Seongnam-si (KR); Chun Ho Kim, Seongnam-si (KR); Soo Bum Kim, Seongnam-si (KR); Eung Ju Park, Seongnam-si (KR); Yong Ha Yoo, Seongnam-si (KR)

(73) Assignee: KAKAO CORP., Jeju-do (KR)

( * ) Notice: Subject to any disclaimer, the term of this patent is extended or adjusted under 35 U.S.C. 154(b) by 0 days.

(21) Appl. No.: 17/137,377

(22) Filed: Dec. 30, 2020

(65) Prior Publication Data

US 2021/0211399 A1 Jul. 8, 2021

(30) Foreign Application Priority Data

Jan. 3, 2020 (KR) .................. 10-2020-0000661

(51) Int. Cl.
*H04L 51/00* (2022.01)
*H04L 51/046* (2022.01)
(Continued)

(52) U.S. Cl.
CPC .......... *H04L 51/216* (2022.05); *H04L 51/046* (2013.01); *H04L 51/42* (2022.05); *H04L 51/56* (2022.05)

(58) Field of Classification Search
CPC ....... H04L 51/046; H04L 51/22; H04L 51/36; H04L 41/026; H04L 51/00; H04L 51/06;
(Continued)

(56) References Cited

U.S. PATENT DOCUMENTS 7,636,751 B2 * 12/2009 Weaver .................. H04L 51/04
709/204
8,856,236 B2 * 10/2014 Moore .................. H04M 15/51
704/260

(Continued)

FOREIGN PATENT DOCUMENTS

KR  1020120030266 A   3/2012
KR   101537482 B1   7/2015
KR  1020190124571 A  11/2019

*Primary Examiner* — Sargon N Nano
(74) *Attorney, Agent, or Firm* — Cantor Colburn LLP

(57) ABSTRACT

A method and apparatus for operating an instant messaging server are disclosed. The method for operating an instant messaging server according to an example embodiment includes managing a message sent and received through a first chat room of a messenger application, managing a message sent and received through a second chat room of a $3^{rd}$ party application receiving support a chat function through the instant messaging server, identifying a user account of an instant messaging service (IMS) linked with a user account of the $3^{rd}$ party service participating in the second chat room, and providing, based on the identified user account of the IMS, the second chat room of the $3^{rd}$ party application to the messenger application.

20 Claims, 9 Drawing Sheets

(51) Int. Cl.
*H04L 51/216* (2022.01)
*H04L 51/42* (2022.01)
*H04L 51/56* (2022.01)

(58) Field of Classification Search
CPC ..... H04L 51/16; H04L 51/32; H04L 12/1813; H04L 12/5093
See application file for complete search history.

(56) References Cited

U.S. PATENT DOCUMENTS

| | | | |
|---|---|---|---|
| 8,874,672 B2* | 10/2014 | Ben-Yoseph | H04L 67/24 715/753 |
| 2010/0011072 A1* | 1/2010 | Mishchenko | G06Q 10/10 709/206 |
| 2010/0250692 A1* | 9/2010 | Kaminsky | H04L 51/04 709/206 |
| 2012/0030295 A1* | 2/2012 | Bernstein | H04L 51/04 709/206 |
| 2014/0006970 A1* | 1/2014 | Casey | H04L 51/32 715/753 |
| 2017/0295210 A1* | 10/2017 | Choi | H04L 51/04 |
| 2020/0142545 A1* | 5/2020 | Wald | G06F 3/0482 |
| 2020/0328907 A1* | 10/2020 | Kim | H04L 41/5093 |
| 2020/0403815 A1* | 12/2020 | Kim | H04L 51/046 |
| 2020/0403949 A1* | 12/2020 | Kim | H04L 51/14 |
| 2021/0058359 A1* | 2/2021 | Lee | H04L 63/0421 |
| 2021/0297371 A1* | 9/2021 | Lee | G06F 16/9536 |

\* cited by examiner

METHOD AND APPARATUS FOR OPERATING INSTANT MESSAGING SERVER

CROSS-REFERENCE TO RELATED APPLICATION(S)

This application claims the benefit of Korean Patent Application No. 10-2020-0000661, filed on Jan. 3, 2020, in the Korean Intellectual Property Office, the disclosure of which is incorporated herein by reference.

BACKGROUND

1. Field of the Invention

Example embodiments relate to a method and apparatus for operating an instant messaging server, and particularly, to a method for operating an instant messaging server that provides support for a chat function to a $3^{rd}$ party application, and shares a corresponding chat room with a messenger application.

2. Description of the Related Art

A messenger service is a service that delivers information in the form of conversation between users. Today, with the rapid development of communication networks such as the Internet, messenger services through the communication networks are becoming common. Using the Internet, users may easily exchange messages with other users anytime, anywhere. As the use of messengers in a mobile environment of a mobile communication terminal is becoming more common, services including a messenger function are gradually increasing.

The increasing number of services including the messenger function has an advantage of meeting various demands of users, however, also has a short-coming of weakening a mutual communication function of a messenger. For example, a user needs to alternately run multiple applications according to a conversation partner or purpose, and when a friend registered in the messenger exists in a mixture of a plurality of services, the user needs to run different kinds of applications according to the friend.

SUMMARY

According to an aspect, there is provided a method for operating an instant messaging server including managing a message sent and received through a first chat room of a messenger application, managing a message sent and received through a second chat room of a $3^{rd}$ party application receiving support for a chat function through the instant messaging server, identifying a user account of an instant messaging service (IMS) linked with a user account of the $3^{rd}$ party service participating in the second chat room, and providing, based on the identified user account of the IMS, the second chat room of the $3^{rd}$ party application to the messenger application.

The providing may include providing an interface for accessing the second chat room with the identified user account of the IMS.

The providing of the interface may include providing an interface for accessing the first chat room and an interface for accessing the second chat room in different categories.

The method may further include providing an interface for accessing the first chat room and an interface for accessing the second chat room in the same category.

The method may further include storing participant information for matching the user account of the $3^{rd}$ party service and the identified user account of the IMS, the participant information corresponding to the second chat room, storing type information indicating a chat room type of the $3^{rd}$ party application, the type information corresponding to the second chat room, and storing setting information including at least one setting of the $3^{rd}$ party application, the setting information corresponding to the second chat room.

The method may further include determining, in response to a request to access the second chat room, a type of an application that has sent the request, and providing, based on participant information corresponding to the second chat room, sender information of the message sent and received through the second chat room according to the type of the application.

The method may further include determining, in response to a request to access the second chat room, a type of an application that has sent the request, and providing, based on setting information corresponding to the second chat room, the second chat room according to the type of the application.

The message sent and received through the second chat room may include a user account of a service corresponding to a type of an application that has sent the message, and an identifier of the second chat room managed by the instant messaging server.

The method may further include providing, to the $3^{rd}$ party application, another user account having a predetermined relationship with the identified user account in the IMS, and sending, to a messenger application of the other user account, a message for inviting the other user account to the second chat room.

The method may further include providing, in response to the message for invitation being selected by the other user account, the second chat room to a messenger application of the other user account.

According to another aspect, there is provide an instant messaging server including at least one processor. The processor may be configured to manage a message sent and received through a first chat room of a messenger application, manage a message sent and received through a second chat room of a $3^{rd}$ party application receiving support for a chat function through the instant messaging server, identify a user account of the IMS linked with a user account of the $3^{rd}$ party service participating the second chat room, and provide, based on the identified user account of the IMS, the second chat room of the $3^{rd}$ party application to the messenger application.

The processor may be configured to provide an interface for accessing the second chat room with the identified user account of the IMS.

The processor may be configured to provide an interface for accessing the first chat room and an interface for accessing the second chat room in different categories.

The processor may be configured to provide an interface for accessing the first chat room and an interface for accessing the second chat room in the same category.

The processor may be configured to store participant information for matching the user account of the $3^{rd}$ party service and the identified user account of the IMS, the participant information corresponding to the second chat room, store type information indicating a chat room type of the $3^{rd}$ party application, the type information corresponding to the second chat room, and store setting information including at least one setting of the 3$^{rd}$ party application, the setting information corresponding to the second chat room.

The processor may be configured to determine, in response to a request to access the second chat room, a type of an application that has sent the request, and provide, based on participant information corresponding to the second chat room, sender information of the message sent and received through the second chat room according to the type of the application.

The processor may be configured to determine, in response to a request to access the second chat room, a type of an application that has sent the request, and provide, based on setting information corresponding to the second chat room, the second chat room according to the type of the application.

The processor may be configured to provide, to the 3$^{rd}$ party application, another user account having a predetermined relationship with the identified user account in the IMS, and send, to a messenger application of the other user account, a message for inviting the other user account to the second chat room.

The processor may be configured to provide, in response to the message for invitation being selected by the other user account, the second chat room to a messenger application of the other user account.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
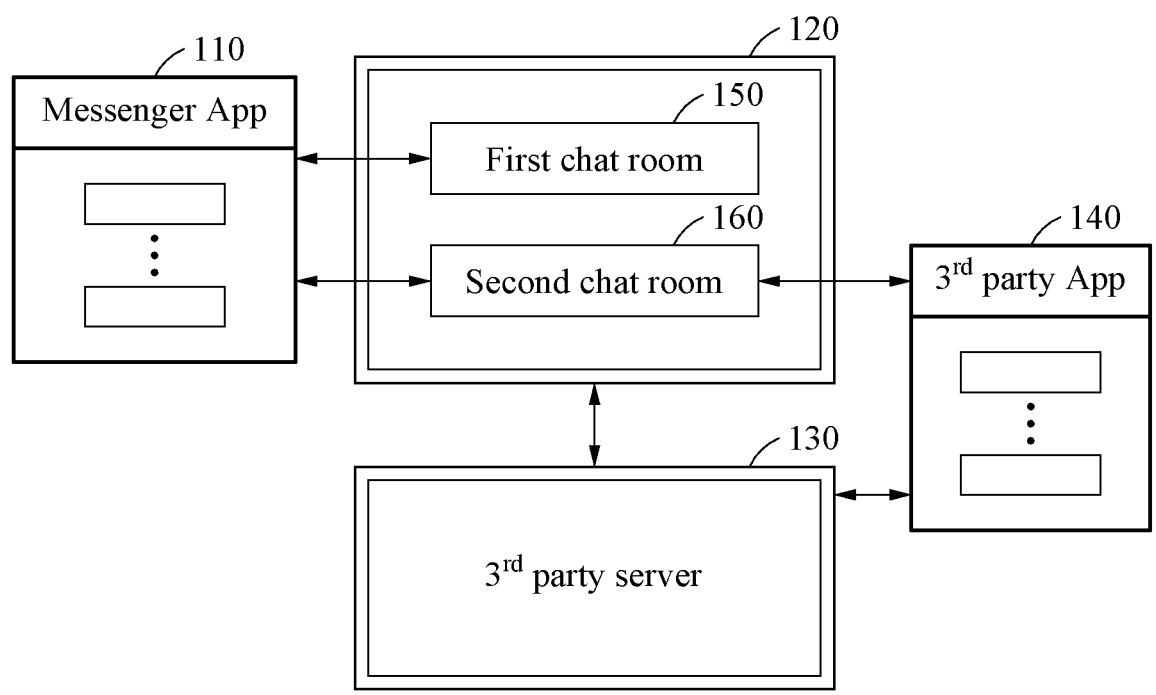
FIG. 1 is a block diagram illustrating a detailed configuration of a system according to an example embodiment.

The following structural or functional descriptions are exemplary to merely describe example embodiments, and the scope of the example embodiments is not limited to the descriptions provided in the present specification. Various changes and modifications can be made to the example embodiments by one skilled in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. The same reference numerals in each drawing indicate the same members.

FIG. 1 is a block diagram illustrating a detailed configuration of a system according to an example embodiment.

Referring to FIG. 1, the system according to an example embodiment may include an instant messaging server 120 that provides an instant messaging service (IMS), at least one first terminal 110 on which a messenger application is installed to receive the IMS, a 3$^{rd}$ party server 130 that provides a 3$^{rd}$ party service, and at least one second terminal 140 on which a 3$^{rd}$ party application is installed to receive the 3$^{rd}$ party service. For ease of description, the first terminal 110 and the second terminal 140 are separately illustrated, but the messenger application and the 3$^{rd}$ party application may be installed on the same terminal.

Chat message exchange between terminals on which the messenger application is installed may be performed through the instant messaging server 120. In this case, a chat room in which message exchange is performed may be referred to as a first chat room 150, and a message sent and received in the first chat room 150 may be displayed in the messenger application. For example, a user of the first terminal 110 may use the IMS by accessing the instant messaging server 120 through the messenger application. The first terminal 110 may denote any electronic device capable of installing and executing the messenger application interoperating with the instant messaging server 120. The messenger application installed on the first terminal 110 may perform a series of operations for providing, to the user, the IMS such as screen configuration, data input, data transmission/reception, data storage, and the like.

The instant messaging server 120 may serve as a service platform that provides the IMS. The instant messaging server 120 may be connected to the first terminal 110, the $3^{rd}$ party server 130, and the second terminal 140 through a network (not illustrated). Here, the network may include the Internet, one or more local area networks, wire area networks, cellular networks, mobile networks, other types of networks, or a combination of the networks.

The instant messaging server 120 may manage a message sent and received through the first chat room 150 of the messenger application. The user of the first terminal 110 may subscribe to the IMS provided by the instant messaging server 120 through the messenger application to generate a user account for the IMS. The first chat room 150 of the messenger application may be a chat room in which messages between user accounts having a specific relationship (for example, a friend relationship or a subscription relationship) are sent and received in the messenger application. The first chat room 150 may send and receive a message according to a function supported by the IMS, even before establishing the specific relationship (for example, when an informational message is sent from an official user account).

The $3^{rd}$ party service according to an example embodiment, which is a service distinct from the IMS, may be understood as a concept that comprehensively includes a service interoperable with the IMS. According to an example embodiment, chat message exchange between terminals on which the $3^{rd}$ party application is installed may be performed through the instant messaging server 120. The chat message exchange may be performed by direct communication with the instant messaging server 120 performed by the terminals on which the $3^{rd}$ party application is installed. Alternatively, the chat message exchange may be performed through the instant messaging server 120 via the $3^{rd}$ party server 130. In this case, a chat room in which the chat message exchange is performed may be referred to as a second chat room 160, and a message sent and received in the second chat room 160 may be displayed in the $3^{rd}$ party application. Although described in detail below, according to an example embodiment, the second chat room 160 may be accessed or joined through the messenger application as well as the $3^{rd}$ party application. The messenger application may distinguish the second chat room 160 from the first chat room 150, and may provide the second chat room 160 to the user. Depending on the example embodiment, the second chat room 160 may be generated in the messenger application as well as the $3^{rd}$ party application.

The $3^{rd}$ party server 130 may provide the $3^{rd}$ party service to the second terminal 140 on which the $3^{rd}$ party application is installed. The second terminal 140 may install and execute the $3^{rd}$ party application so as to receive the $3^{rd}$ party service. The $3^{rd}$ party application installed on the second terminal 140 may perform a series of operations for providing, to the user, the $3^{rd}$ party service such as service screen configuration, data input, data transmission/reception, data storage, and the like.

The $3^{rd}$ party server 130 may receive support for a chat function from the instant messaging server 120. For example, in addition to functions primarily provided by the $3^{rd}$ party service, the chat function may be required for a business messenger, game in-app chat, in-app counseling, and real-time event delivery. In this case, the $3^{rd}$ party server 130 may receive support for the chat function by using an application program interface (API) of the instant messaging server 120 instead of implementing the chat function on its own. As described above, the second terminal 140 may directly communicate with the instant messaging server 120 or communicate with the instant messaging server 120 via the $3^{rd}$ party server 130 to receive support for the chat function in the $3^{rd}$ party service.

Although not illustrated in the drawings, depending on the example embodiment, the $3^{rd}$ party service may be implemented only with the $3^{rd}$ party application 140, without the $3^{rd}$ party server 130. Even in this case, the $3^{rd}$ party application 140 may receive support for the chat function by using a messaging API of the instant messaging server 120.

The instant messaging server 120 may manage a message sent and received through the second chat room 160 of the $3^{rd}$ party application. The second chat room 160 of the $3^{rd}$ party application may be a chat room in which messages are sent and received between user accounts of the $3^{rd}$ party application.

The increasing number of $3^{rd}$ party services including the chat function may have an advantage in that it is possible to meet various demands of a user. However, the user may also have inconvenience of having to alternately run multiple applications depending on a conversation partner or purpose. Accordingly, the instant messaging server 120 may provide the second chat room 160 through the IMS as well as the $3^{rd}$ party service. The instant messaging server 120 may identify a user account of the IMS linked with a user account of the $3^{rd}$ party service, and may provide, by using the user account identified in the IMS, the second chat room 160 of the $3^{rd}$ party application to the messenger application.

As a result, the user may receive a message received through the second chat room 160 of the $3^{rd}$ party application in the messenger application. Furthermore, the user may send a message to the second chat room 160 of the $3^{rd}$ party application in the messenger application.

According to an example embodiment, the second chat room 160 may also displayed in the messenger application by connection and setting (for example, user setting or administrator setting) of a user account of each application. In this case, the user of the first terminal 110 on which the messenger application is installed may send a message to the second terminal 140 on which the $3^{rd}$ party application is installed through the second chat room 160 displayed in the messenger application, or may receive a message from the second terminal 140. Although described in detail below, the first chat room 150 and the second chat room 160 may be displayed separately in the messenger application (for example, displayed in a manner of being divided into separate tabs or displayed in a manner of being distinguished in a chat room list).

According to an example embodiment, the $3^{rd}$ party server 130 may separately store information on the second chat room 160 and a message exchanged in the second chat room 160, and may limit or activate a specific function of the second chat room 160.

In FIG. 1, for ease of description, only the 3$^{rd}$ party server 130 and the second terminal 140 for one 3$^{rd}$ party service are illustrated, however, the instant messaging server 120 may provide the chat function to a plurality of 3$^{rd}$ party services.

A method for identifying the user account of the IMS linked with the user account of the 3$^{rd}$ party service and providing a chat room of the 3$^{rd}$ party application to the messenger application is described below.

Figure 2:
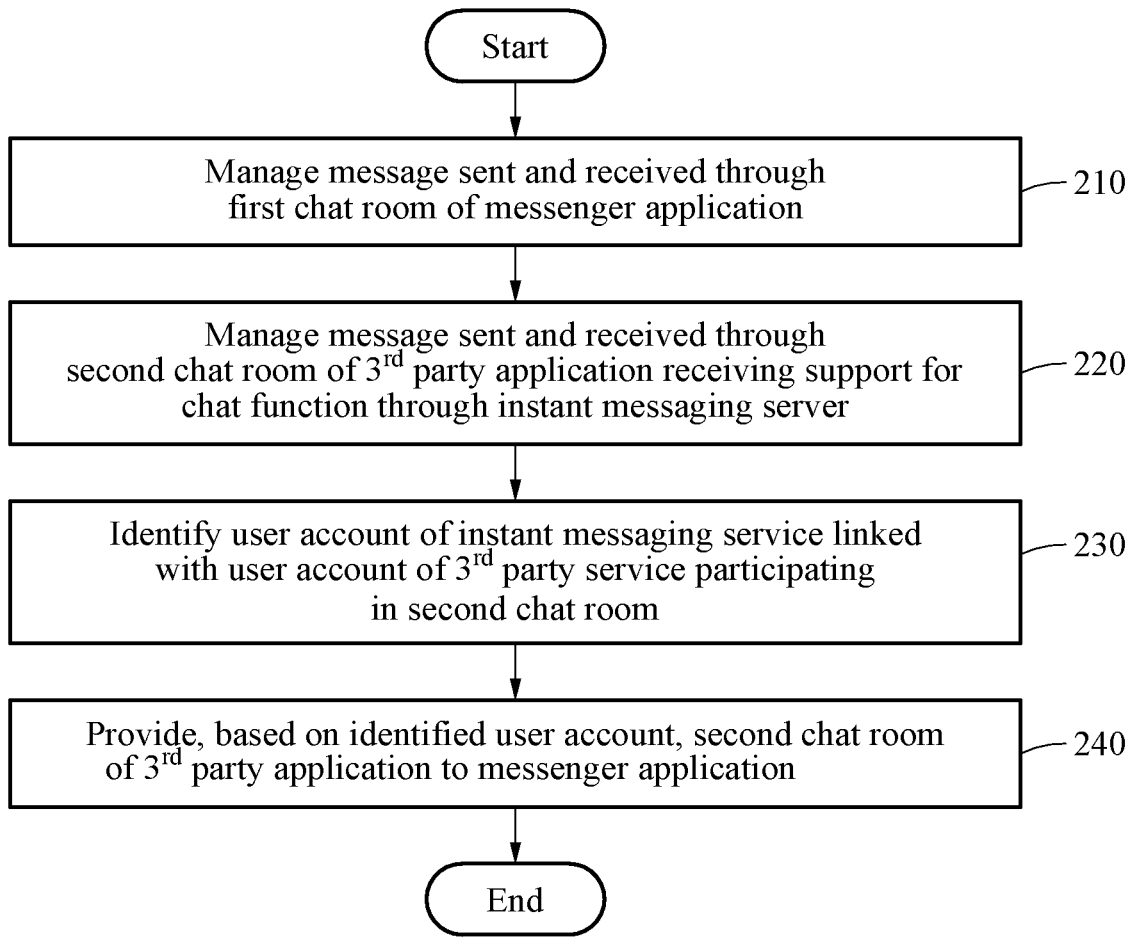
FIG. 2 is a flowchart illustrating a method for operating an instant messaging server according to an example embodiment.

FIG. 2 is a flowchart illustrating a method for operating an instant messaging server according to an example embodiment.

Referring to FIG. 2, operations 210 to 240 may be performed by the instant messaging server 120 described above with reference to FIG. 1. The instant messaging server 120 may be implemented by one or more hardware modules, one or more software modules, or various combinations thereof. In addition, although the operations of FIG. 2 may be performed in the illustrated order and manner, the order of some operations may be changed or some operations may be omitted without departing from the spirit and scope of the illustrated example embodiment. The multiple operations illustrated in FIG. 2 may be performed in parallel or simultaneously.

In operation 210, the instant messaging server 120 may manage a message sent and received through a first chat room of the messenger application. Here, the first chat room may be the first chat room 150 described above with reference to FIG. 1. The message sent and received through the first chat room may include the user account of the IMS that has sent the message and an identifier of the first chat room managed by the instant messaging server 120. Each first chat room may be assigned with a unique identifier, and the instant messaging server 120 may manage a message based on the identifier of the first chat room included in the message received from the IMS.

The instant messaging server 120 may provide messages of the first chat rooms to the messenger application. A message according to an example embodiment may include not only an informational message based on a text and an emoticon, but also a content such as an image and a video. The instant messaging server 120 may detect whether a message is newly sent or received in the first chat room of the messenger application. The instant messaging server 120 may manage activity logs left by users of the IMS in relation to a message.

In operation 220, the instant messaging server 120 may manage a message sent and received through a second chat room of the 3$^{rd}$ party application. Here, the second chat room may be the second chat room 160 described above with reference to FIG. 1. The instant messaging server 120 may provide, to the 3$^{rd}$ party application, messages of the second chat rooms directly or via the 3$^{rd}$ party server.

The instant messaging server 120 may provide support for the chat function to the 3$^{rd}$ party service by using various messaging APIs. For example, a chatting solution of the 3$^{rd}$ party service may be built through messaging API interoperation. The 3$^{rd}$ party application may communicate with the instant messaging server directly or via the 3$^{rd}$ party server, thereby providing a message transmission/reception history through a chat room of the corresponding 3$^{rd}$ party application.

In addition, various types of setting information of the second chat room may be controlled through the messaging API provided by the instant messaging server. Setting information of the second chat room may be set by the 3$^{rd}$ party server or the 3$^{rd}$ party application. The setting information of the second chat room may be stored in the instant messaging server 120, or may be separately stored in the 3$^{rd}$ party server 130. The setting information of the second chat room may include a period for storing a conversation content, whether to process to be read, whether it is possible to view a conversation before participation, whether it is possible to modify a conversation, whether it is anonymous, whether invitation is possible, and whether to support a URL enabling participation. The setting information of the second chat room may be combined or selected according to need of the 3$^{rd}$ party service.

Data of the second chat room (for example, a conversation content) may be stored in the instant messaging server 120. When necessary, the data may be received and exposed from the instant messaging server 120. For example, by using the messaging API such as fetch, the instant messaging server 120 may load and display a previous conversation content. As a result, multi-device support and client implementation may be simplified, and a response related to a chat solution such as deletion and/or modification of the conversation content may be facilitated.

In operation 230, the instant messaging server 120 may identify the user account of the IMS linked with the user account of the 3$^{rd}$ party service participating in the second chat room. The instant messaging server 120 may store participant information for matching the user account of the IMS linked with the user account of the 3$^{rd}$ party service, and may identify, based on the participant information, the user of the IMS linked with the user account of the 3$^{rd}$ party service.

More specifically, sender information of a message sent and received through the second chat room of the 3$^{rd}$ party application may include the user account of the 3$^{rd}$ party service that has sent the message, and may include an identifier of the second chat room managed by the instant messaging server 120 as chat room information. The instant messaging server 120 may identify, based on user account information stored by matching the user account of the 3$^{rd}$ party service and the user account of the IMS, the user account of the IMS linked with the user account of the 3$^{rd}$ party service that has sent and received the message through the second chat room.

In operation 240, the instant messaging server 120 may provide, based on the identified user account of the IMS, the second chat room of the 3$^{rd}$ party application to the messenger application. As a result, the instant messaging server 120 may provide the second chat room through the IMS as well as the 3$^{rd}$ party service. For example, a user may access, participate in, or generate the second chat room of the 3$^{rd}$ party application in the messenger application.

According to an example embodiment, when the second chat room of the 3$^{rd}$ party application is generated, the instant messaging server 120 may check whether users participating in the second chat room have user accounts of the IMS. A user participating in the second chat room may apply for a user account linkage with the IMS through the 3$^{rd}$ party application. The instant messaging server 120 may manage, in response to the user's account linkage request, the user account of the IMS and the user account of the 3$^{rd}$ party service in linkage with each other.

According to an example embodiment, the second chat room may be generated in the messenger application. For example, when a new chat room is generated in the messenger application, the 3$^{rd}$ party application to be linked may be designated by the user. Alternatively, in response to a pre-generated chat room, a request for linkage with a specific 3$^{rd}$ party application may be inputted. In this case, the instant messaging server 120 may check whether users participating in a corresponding chat room have user accounts of the $3^{rd}$ party service to be linked, and may manage the user account of the IMS and the user account of the $3^{rd}$ party service in linkage with each other.

When a user account IMS_A of the IMS and a user account THIRD_A of the $3^{rd}$ party service are stored in linkage with each other, the instant messaging server may provide a list of chat rooms in which the user account THIRD_A of the $3^{rd}$ party service is participating in the messenger application installed on the user's terminal. As a result, the user may participate in a conversation in the $3^{rd}$ party service through the messenger application without running the $3^{rd}$ party application.

According to operations 230 to 240, the instant messaging server 120 may identify the user account of the IMS linked with the user account of the $3^{rd}$ party service participating in the second chat room, and may provide, based on the identified user account of the IMS, the second chat room of the $3^{rd}$ party application through the IMS.

As a result, the user may receive a message sent or received through the second chat room of the $3^{rd}$ party application through the messenger application in real time. Conversely, the user may receive a message sent or received through the second chat room of the messenger application through the $3^{rd}$ party application in real time.

According to an example embodiment, the instant messaging server 120 may store type information indicating a chat room of the $3^{rd}$ party application, the type information corresponding to the second chat room. For example, the instant messaging server 120 may store type information indicating that a corresponding chat room is the second chat room. The instant messaging server 120 may identify, based on pre-stored type information, whether a managed chat room is the first chat room or the second chat room.

In addition, the instant messaging server 120 may determine, in response to a request to access the second chat room, a type of an application that has sent the request. The instant messaging server 120 may provide, based on pre-stored participant information, sender information of a message sent and received through the second chat room according to the type of the application.

The sender information, which is information displayed as a status of a sender in a chat room, may be different for each application. For example, sender information of the messenger application may include a profile name, a profile picture, a status message, a background screen, and background music, and sender information of the $3^{rd}$ party application may include only a profile name and a profile picture. The profile name or profile picture set for each application may be the same or different. A specific example of providing sender information of a message according to the type of the application is described below with reference to FIGS. 6A to 6B.

Figure 3:
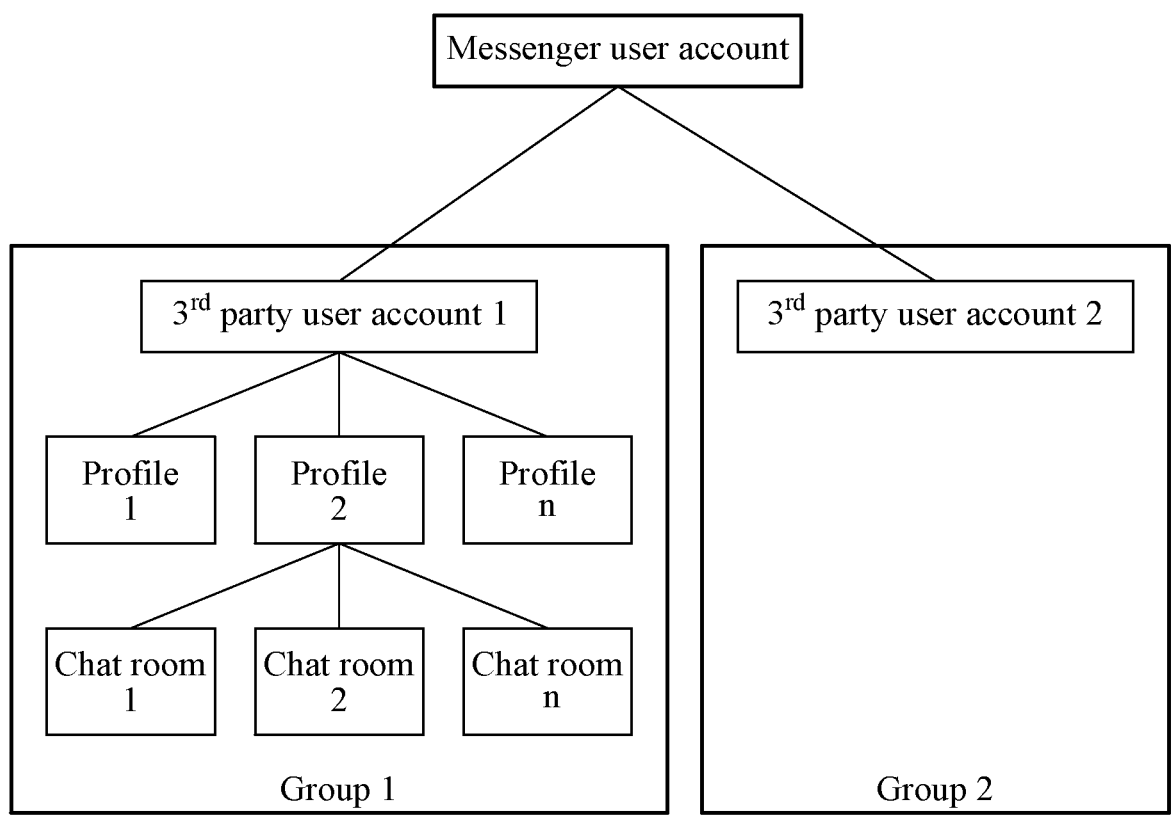
FIG. 3 is a diagram illustrating a user account of a 3$^{rd}$ party service linked with a user account of an instant messaging service (IMS) according to an example embodiment.

FIG. 3 is a diagram illustrating a user account of a $3^{rd}$ party service linked with a user account of an IMS according to an example embodiment.

Referring to FIG. 3, the user account of the IMS according to an example embodiment may be linked with the user account of the $3^{rd}$ party service. A method for linking the user account of the IMS and the user account of the $3^{rd}$ party service with each other is described in detail below with reference to FIG. 4.

In example embodiments, the instant messaging server may provide the chat function by linking a user account of an IMS and a user account of a $3^{rd}$ party service of each individual user with each other. To this end, the user account of the IMS and the user account of the $3^{rd}$ party service of each individual user may be pre-registered in the instant messaging server.

A user of the $3^{rd}$ party service may generate at least one profile linked with the user account of the $3^{rd}$ party service. A profile of the user account of the $3^{rd}$ party service may exist separately from a profile of the user account of the IMS.

When a plurality of $3^{rd}$ party services exist, the user account and profile of the $3^{rd}$ party service may be controlled for each $3^{rd}$ party service through the messaging API. In this case, a chat between users of the same $3^{rd}$ party service may be possible, however, a conversation between users of different $3^{rd}$ party services may be limited. However, even the users of the different $3^{rd}$ party services may be able to chat in a chat room through invitation and generation using the user account of the IMS.

Figure 4:
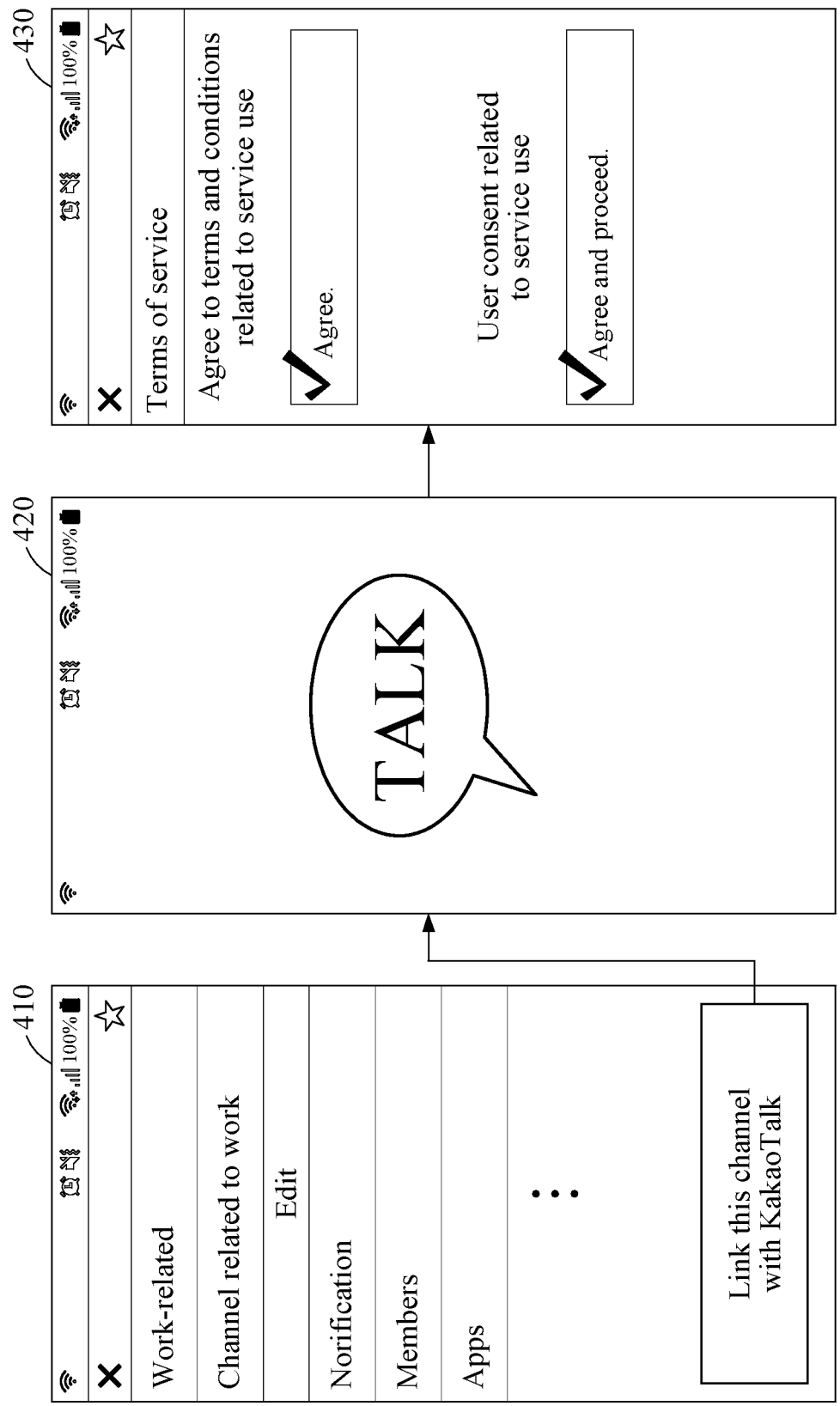
FIG. 4 is a diagram illustrating a method for linking a user account of an IMS and a user account of a 3$^{rd}$ party service with each other according to an example embodiment.

FIG. 4 is a diagram illustrating a method for linking a user account of an IMS and a user account of a $3^{rd}$ party service with each other according to an example embodiment.

Referring to FIG. 4, an interface for linking the user account of the $3^{rd}$ party service with the user account of the IMS may be provided. For example, referring to a drawing 410, the $3^{rd}$ party application may provide an interface for requesting linkage between the user account of the $3^{rd}$ party service and the user account of the IMS.

Referring to drawings 420 and 430, the messenger application may provide an interface for consent to the linkage. The instant messaging server may link, in response to a user input agreeing to the linkage, the user account of the $3^{rd}$ party service with the user account of the IMS. For example, the instant messaging server may store the user account of the $3^{rd}$ party service and the user account of the IMS linked with each other as user account information managed by the instant messaging server. Alternatively, the instant messaging server may store the user account of the $3^{rd}$ party service and the user account of the IMS linked with each other as participant information of a corresponding chat room.

Figure 5:
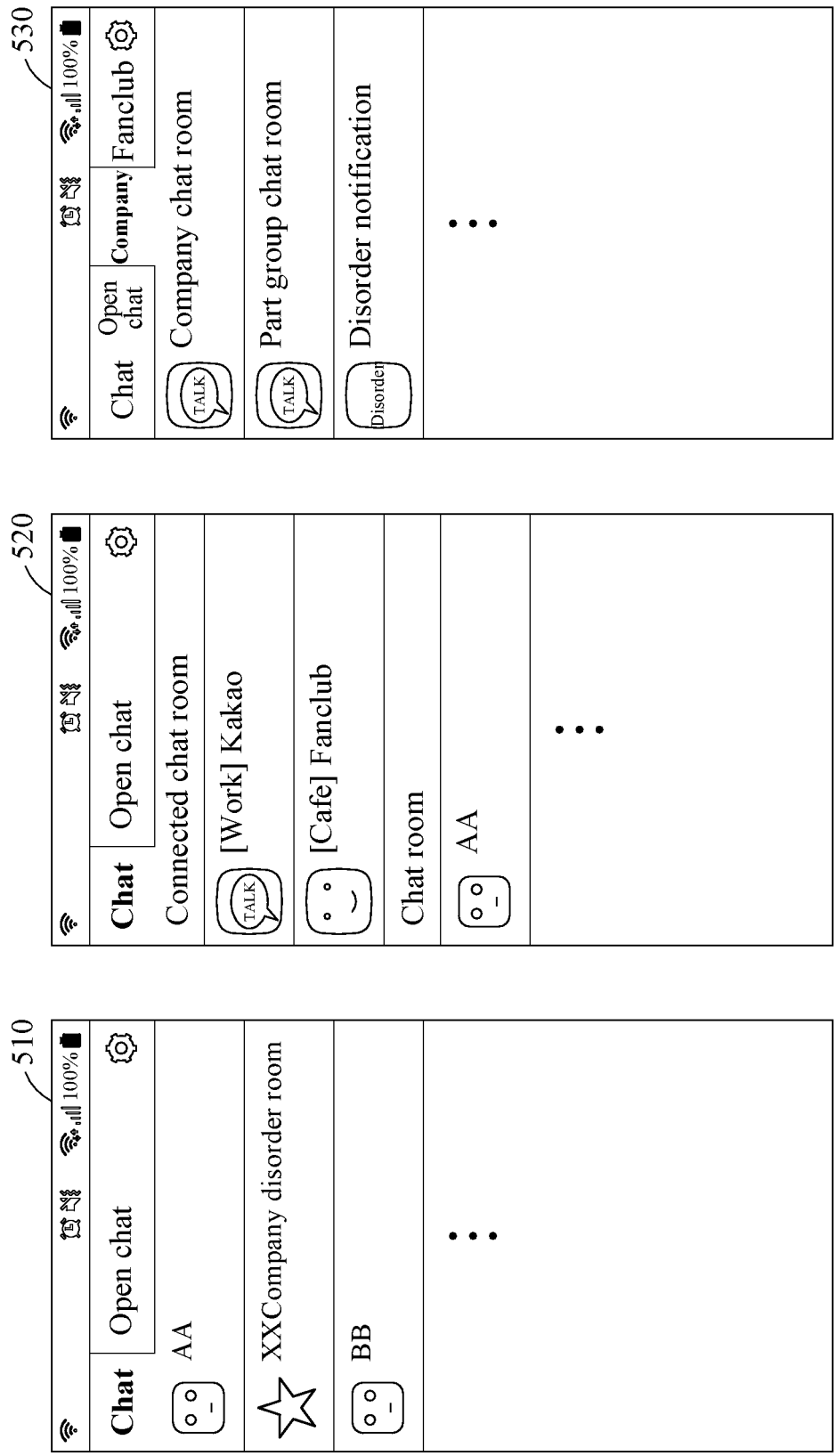
FIG. 5 is a diagram illustrating a method for providing an interface for accessing a second chat room with an identified user account of an IMS according to an example embodiment.

FIG. 5 is a diagram illustrating a method for providing an interface for accessing a second chat room with an identified user account of an IMS according to an example embodiment.

Referring to FIG. 5, the instant messaging server according to an example embodiment may provide the interface for accessing the second chat room with the identified user account of the IMS.

The instant messaging server according to an example embodiment may provide an interface for accessing the first chat room and the interface for accessing the second chat room in the same category. For example, referring to a drawing 510, the messenger application may display the interface for accessing the first chat room (for example, "AA" chat room or "BB" chat room) and the interface for accessing the second chat room (for example, "XX company disorder room" chat room) together in a "chat" tap. Although not illustrated in the drawing, depending on the example embodiment, information indicating that a specific chat room is the second chat room may be further displayed in the chat room list. For example, a visual effect may be applied to a profile picture of the second chat room so that the second chat room is distinguished from the first chat room. Alternatively, additional information may be added to a title of the second chat room so that the second chat room is distinguished from the first chat room.

The instant messaging server according to another example embodiment may provide the interface for accessing the first chat room and the interface for accessing the second chat room in different categories. For example, referring to a drawing 520, the messenger application may display the second chat room as a "connected chat room", and may display the first chat room as a "chat room", so that the first chat room and the second chat room may be displayed in separate categories in the chat room list. Alternatively, referring to a drawing 530, the messenger application may display first chat rooms and second chat rooms on separate tabs based on a type of each chat room. For example, a chat tab and an open chat tab may correspond to types of the first chat rooms, and a company tab and a fan club tab may correspond to types of the second chat rooms.

Here, the method illustrated in the drawings 520 and 530 are merely exemplary, and various methods for providing the interface for accessing the first chat room and the interface for accessing the second chat room in different categories may be applied in addition to the method.

Figure 6A:
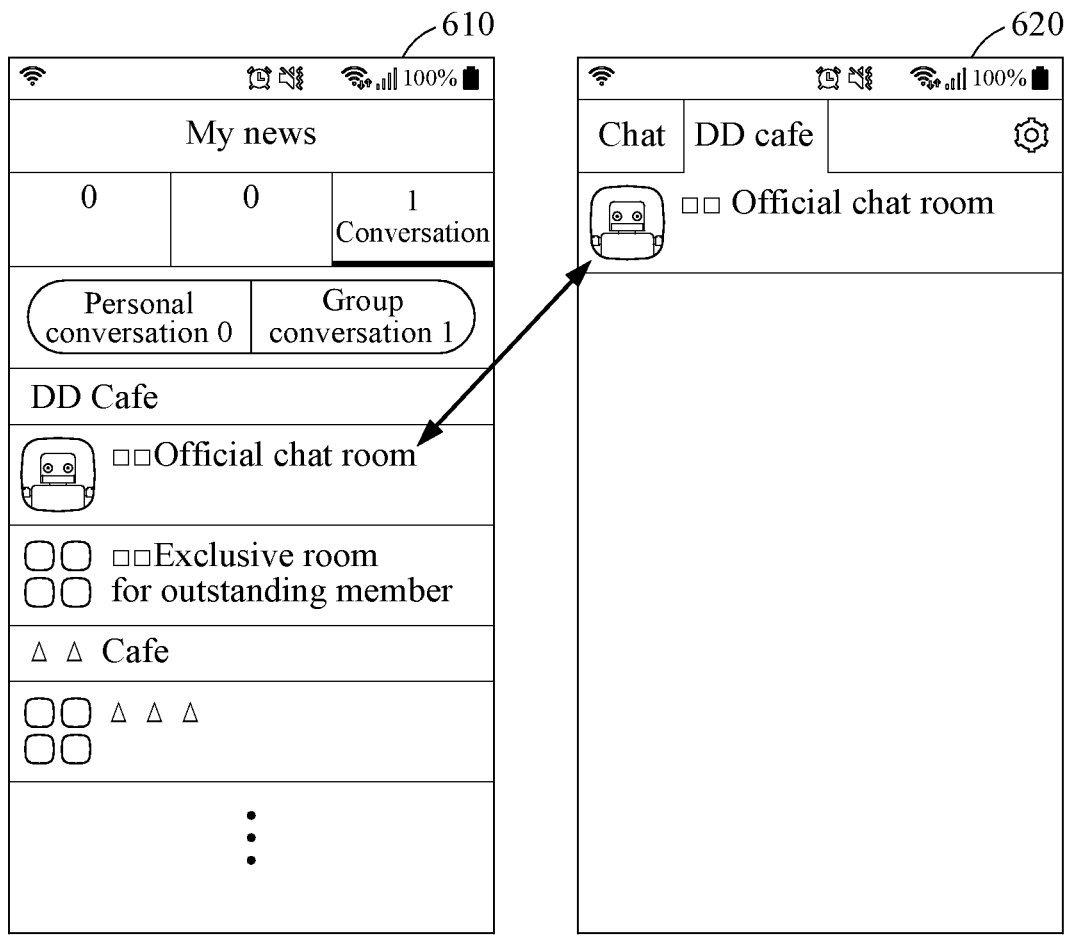
FIGS. 6A and 6B are diagrams illustrating a specific example of providing a chat room of a 3$^{rd}$ party application to a messenger application according to an example embodiment.
Figure 6B:
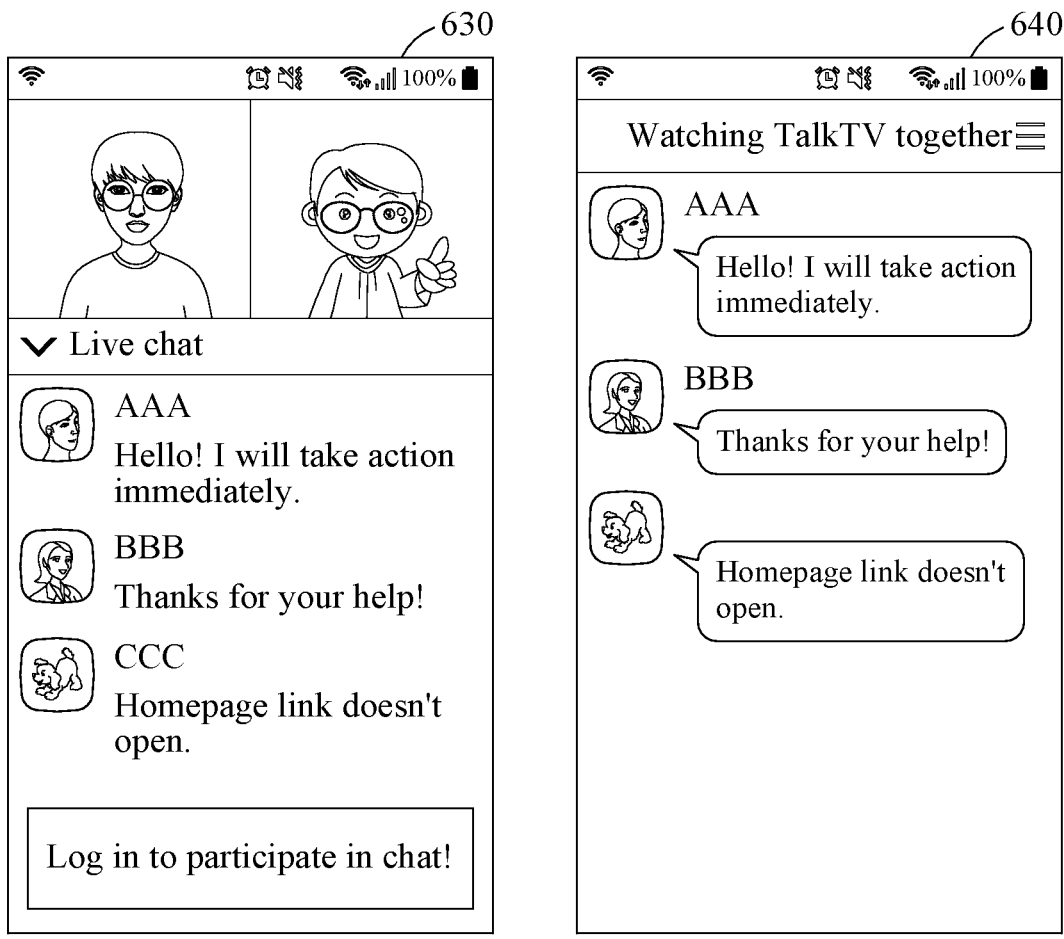

FIGS. 6A and 6B are diagrams illustrating a specific example of providing a chat room of a $3^{rd}$ party application to a messenger application according to an example embodiment.

Referring to FIG. 6A, a drawing 610 is an example of the interface for accessing the second chat room in the $3^{rd}$ party application (for example, a cafe application), and a drawing 620 is an example of the interface for accessing the second chat room in the messenger application.

The instant messaging server may provide support for the chat function to the cafe application, and may provide a second chat room of the cafe application (for example, a chat room in which message are sent and received between members of the cafe application) to the messenger application through a linkage request from a cafe manager. For example, when an official chat room of a DD cafe provided in the cafe application of the drawing 610 is linked with the messenger application, a corresponding chat room may be accessed through a DD cafe tab of the messenger application of the drawing 620. After linkage, messages sent and received in the corresponding chat room of the cafe application may be checked in the corresponding chat room of the messenger application, and further, messages transmitted and received in the corresponding chat room of the messenger application may be checked in the corresponding chat room of the cafe application.

In addition, the instant messaging server may provide the messaging API that controls various types of setting information of the second chat room. For example, an administrator who is granted permission to control setting information related to a chat function of the $3^{rd}$ party service may control the various types of setting information of the second chat room through the messaging API.

In response to a request to access the second chat room, the instant messaging server may determine a type of an application that has sent the request, and may provide, based on the setting information, the second chat room according to the type of application. For example, when the cafe application requests access to the second chat room, the instant messaging server may provide the second chat room displayed with a profile of a cafe service, and when the messenger application requests access to the second chat room, the instant messaging server may provide the second chat room displayed with a profile of the IMS.

Referring to FIG. 6B, a drawing 630 is an example of a second chat room interface provided by the $3^{rd}$ party application (for example, a TV application), and a drawing 640 is an example of a second chat room interface provided by the messenger application.

A second chat room provided by the TV application may be set as a one-time chat room in which a flowing chat content is not stored. Since a corresponding chat room is a one-time chat room, a chat log may not be stored.

Although not illustrated in the drawing, the $3^{rd}$ party application may be a taxi application. In this case, a customer may check a message sent by a taxi driver in a taxi application in the customer's own messenger application. A second chat room provided by the messenger application may be set to be automatically locked or removed according to a preset condition (for example, after a certain period of time after using a taxi). In addition, a group chat room in which a plurality of taxi drivers are participating in an application for a driver may be linked with the messenger application.

The above-described $3^{rd}$ party applications are merely illustrated for the purpose of describing example embodiments, and the example embodiments may be implemented in various different forms, and are not limited to the example embodiments described herein.

Figure 7:
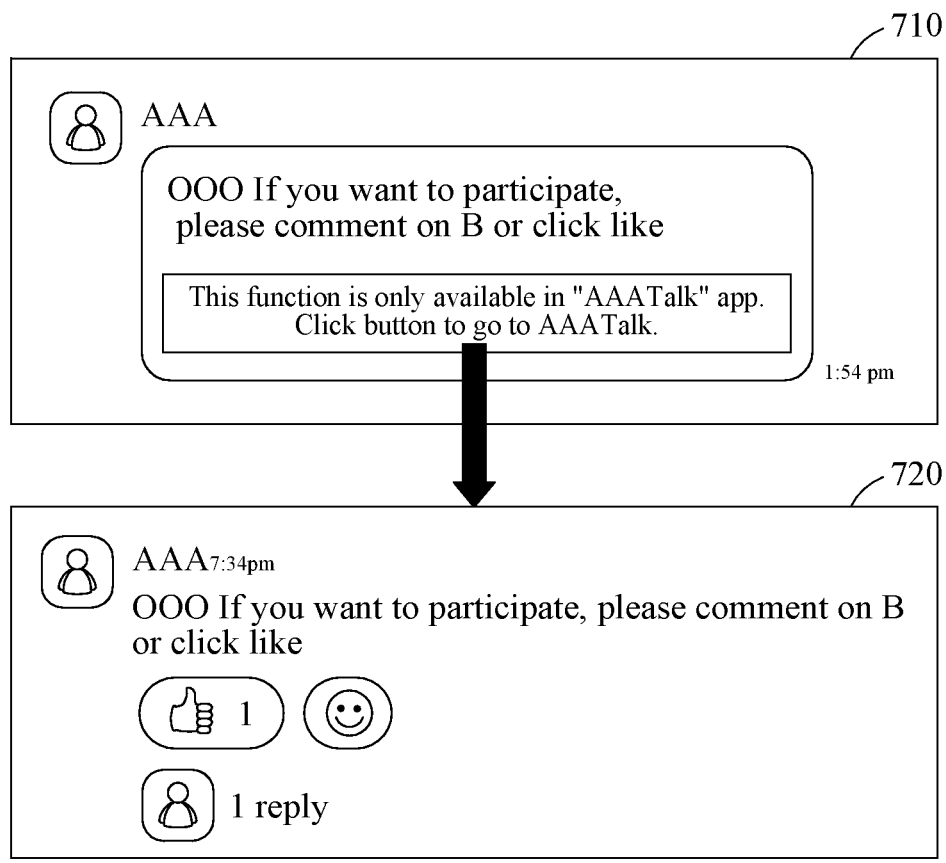
FIG. 7 is a diagram illustrating a function that is available only in a 3$^{rd}$ party application according to an example embodiment.

FIG. 7 is a diagram illustrating a function that is available only in a $3^{rd}$ party application according to an example embodiment.

Referring to FIG. 7, a function specialized for the $3^{rd}$ party service according to an example embodiment may be limited in the messenger application. For example, when the $3^{rd}$ party service is an SNS service, a second chat room 710 of the messenger application may not provide a function to write a "comment" or a function to click a "like" button, but may provide only an interface that connects to the $3^{rd}$ party application for a corresponding function. When a corresponding interface is selected, the $3^{rd}$ party application may be launched to display a corresponding post 720.

Depending to the example embodiment, the function specialized for the $3^{rd}$ party service may be provided to the second chat room in a form adapted for a chat window interface. For example, a speech balloon for a "comment" or a speech balloon for "like" may be separately designed and provided through the second chat room.

Figure 8:
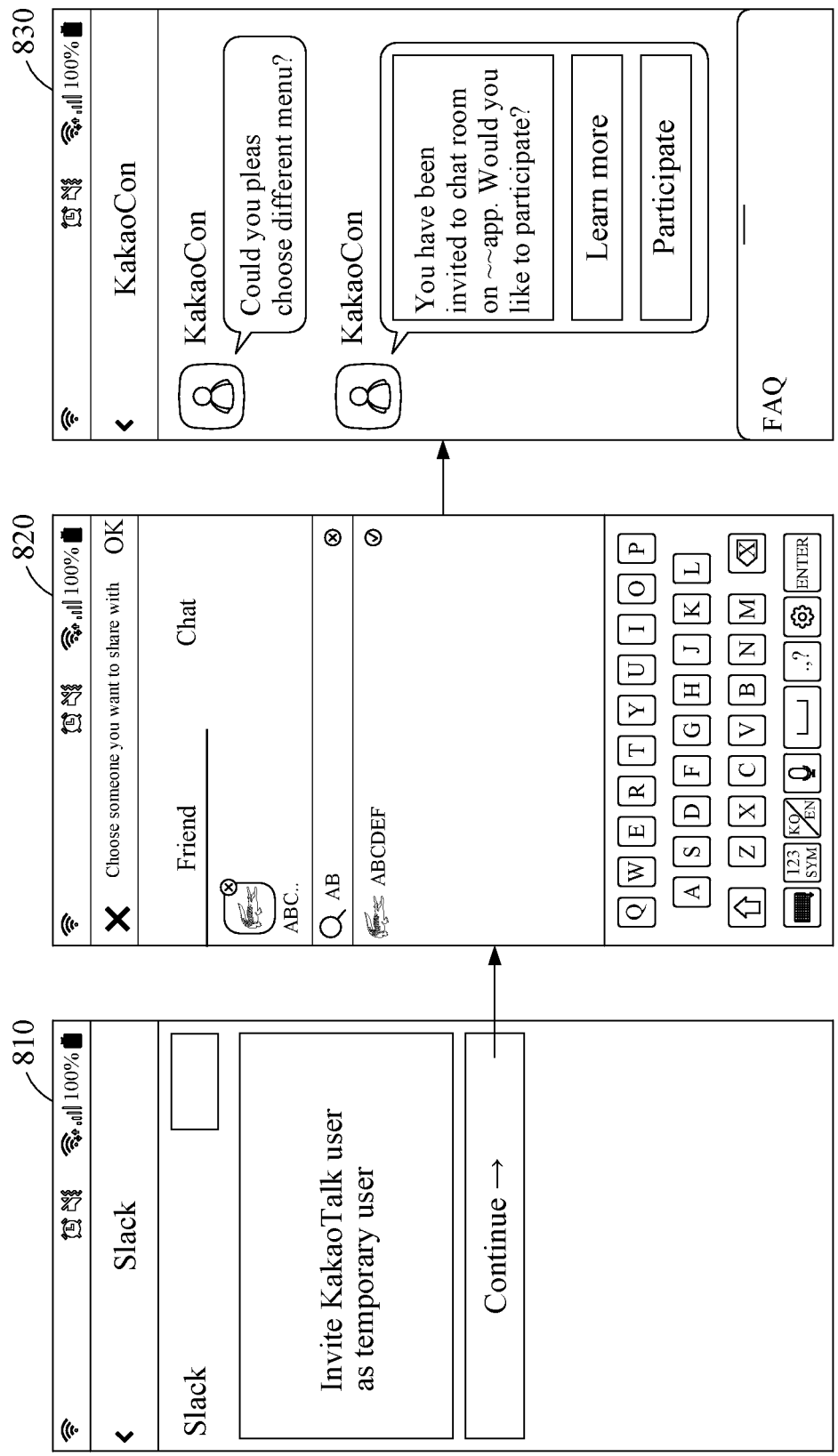
FIG. 8 is a diagram illustrating a method for inviting another user account of an IMS having a predetermined relationship with a user account identified in the IMS to a second chat room through a 3$^{rd}$ party application according to an example embodiment.

FIG. 8 is a diagram illustrating a method for inviting another user account of an IMS having a predetermined relationship with a user account identified in the IMS to a second chat room through a $3^{rd}$ party application according to an example embodiment.

Referring to FIG. 8, the $3^{rd}$ party application may provide an interface 810 for inviting a user who has not subscribed to the $3^{rd}$ party service. The $3^{rd}$ party application may provide, in response to an input of selecting an invitation performing icon (for example, a "continue" icon) included in the interface 810, an interface 820 that displays another user account of the IMS (for example, an instant messaging account of user B) having a predetermined relationship with the user account of the IMS (for example, an instant messaging account of user A) linked with the user account of the corresponding $3^{rd}$ party service (for example, a $3^{rd}$ party account of user A). The instant messaging server may send, in response to an input of selecting one or more user accounts to be invited, a message for inviting the selected user account to the second chat room to the messenger application of the selected user account. As described above, the user's invitation request may be generated in the $3^{rd}$ party application, and a message including the invitation request may be delivered to an invitee's messenger application.

Further, the instant messaging server may provide, in response to invitation being accepted by the invited user account, the interface for accessing the second chat room of the 3$^{rd}$ party application. For example, the invitee's messenger application may receive, from the instant messaging server, an interface for processing simple subscription or consent of the 3$^{rd}$ party service through a web view, or an interface for inducing installation of the 3$^{rd}$ party application, and may provide the interface to the invitee.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described example embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method for operating an instant messaging server comprising:
    managing a message sent and received through a messenger application of an instant messaging service (IMS);
    managing a message sent and received through a second chat room of a 3$^{rd}$ party application of a 3$^{rd}$ party service receiving support for a chat function through the instant messaging server;
    identifying a user account of the IMS linked with a user account of the 3$^{rd}$ party service participating in the second chat room; and
    providing, based on the identified user account of the IMS, the second chat room of the 3$^{rd}$ party application to the messenger application.

2. The method of claim 1, wherein the providing comprises providing an interface for accessing the second chat room with the identified user account of the IMS.

3. The method of claim 2, wherein the providing of the interface comprises providing an interface for accessing a first chat room of the messenger application and an interface for accessing the second chat room in different categories.

4. The method of claim 2, further comprising:
    providing an interface for accessing a first chat room of the messenger application and an interface for accessing the second chat room in the same category.

5. The method of claim 1, further comprising:
    storing participant information for matching the user account of the 3$^{rd}$ party service and the identified user account of the IMS, the participant information corresponding to the second chat room;
    storing type information indicating a chat room type of the 3$^{rd}$ party application, the type information corresponding to the second chat room; and
    storing setting information including at least one setting of the 3$^{rd}$ party application, the setting information corresponding to the second chat room.

6. The method of claim 1, further comprising:
    determining, in response to a request to access the second chat room, a type of an application that has sent the request; and
    providing, based on participant information corresponding to the second chat room, sender information of the message sent and received through the second chat room according to the type of the application.

7. The method of claim 1, further comprising:
    determining, in response to a request to access the second chat room, a type of an application that has sent the request; and
    providing, based on setting information corresponding to the second chat room, the second chat room according to the type of the application.

8. The method of claim 1, wherein the message sent and received through the second chat room comprises:
    a user account of a service corresponding to a type of an application that has sent the message; and
    an identifier of the second chat room managed by the instant messaging server.

9. The method of claim 1, further comprising:
providing, to the 3$^{rd}$ party application, another user account having a predetermined relationship with the identified user account in the IMS; and
sending, to a messenger application of the other user account, a message for inviting the other user account to the second chat room.

10. The method of claim 9, further comprising:
providing, in response to the message for invitation being selected by the other user account, the second chat room to a messenger application of the other user account.

11. A non-transitory computer-readable medium storing computer-readable instruction that, when executed by a processor, cause the processor to perform the method of claim 1.

12. An instant messaging server comprising:
at least one processor,
wherein the processor is configured to:
manage a message sent and received through a messenger application of an instant messaging service (IMS);
manage a message sent and received through a second chat room of a 3$^{rd}$ party application of a 3$^{rd}$ party service receiving support for a chat function through the instant messaging server;
identify a user account of the IMS linked with a user account of the 3$^{rd}$ party service participating the second chat room; and
provide, based on the identified user account of the IMS, the second chat room of the 3$^{rd}$ party application to the messenger application.

13. The message server of claim 12, wherein the processor is configured to provide an interface for accessing the second chat room with the identified user account of the IMS.

14. The message server of claim 13, wherein the processor is configured to provide an interface for accessing first chat room of the messenger application and an interface for accessing the second chat room in different categories.

15. The message server of claim 13, wherein the processor is configured to provide an interface for accessing first chat room of the messenger application and an interface for accessing the second chat room in the same category.

16. The message server of claim 12, wherein the processor is configured to:
store participant information for matching the user account of the 3$^{rd}$ party service and the identified user account of the IMS, the participant information corresponding to the second chat room;
store type information indicating a chat room type of the 3$^{rd}$ party application, the type information corresponding to the second chat room; and
store setting information including at least one setting of the 3$^{rd}$ party application, the setting information corresponding to the second chat room.

17. The message server of claim 13, wherein the processor is configured to:
determine, in response to a request to access the second chat room, a type of an application that has sent the request; and
provide, based on participant information corresponding to the second chat room, sender information of the message sent and received through the second chat room according to the type of the application.

18. The message server of claim 13, wherein the processor is configured to:
determine, in response to a request to access the second chat room, a type of an application that has sent the request; and
provide, based on setting information corresponding to the second chat room, the second chat room according to the type of the application.

19. The message server of claim 13, wherein the processor is configured to:
provide, to the 3$^{rd}$ party application, another user account having a predetermined relationship with the identified user account in the IMS; and
send, to a messenger application of the other user account, a message for inviting the other user account to the second chat room.

20. The message server of claim 13, wherein the processor is configured to provide, in response to the message for invitation being selected by the other user account, the second chat room to a messenger application of the other user account.

* * * * *